(12) United States Patent
Daigle et al.

(10) Patent No.: US 10,753,521 B1
(45) Date of Patent: Aug. 25, 2020

(54) INNER DIAMETER SEAL GASKET

(71) Applicants: Damian Daigle, Rayne, LA (US);
Joseph E. Wilson, Lafayette, LA (US);
W. Thomas Forlander, Lafayette, LA (US)

(72) Inventors: Damian Daigle, Rayne, LA (US);
Joseph E. Wilson, Lafayette, LA (US);
W. Thomas Forlander, Lafayette, LA (US)

(73) Assignee: ADVANCE PRODUCTS & SYSTEMS, LLC, Scott, LA (US)

( * ) Notice: Subject to any disclaimer, the term of this patent is extended or adjusted under 35 U.S.C. 154(b) by 0 days.

(21) Appl. No.: 16/427,379

(22) Filed: May 31, 2019

(51) Int. Cl.
| *F16L 23/18* | (2006.01) |
| *F16L 25/02* | (2006.01) |
| *F16J 15/08* | (2006.01) |
| *F16J 15/06* | (2006.01) |

(52) U.S. Cl.
CPC ............. *F16L 23/18* (2013.01); *F16L 25/026* (2013.01); *F16J 15/064* (2013.01); *F16J 2015/0856* (2013.01)

(58) Field of Classification Search
CPC ........ F16L 23/18; F16L 25/026; F16J 15/061; F16J 15/064; F16J 15/0825; F16J 2015/0856; F16J 2015/0862
See application file for complete search history.

(56) References Cited

U.S. PATENT DOCUMENTS

| 1,635,482 A | 7/1927 | Joyce |
| 1,738,513 A | 12/1929 | Bailey |
| 2,407,076 A | 9/1946 | Harkness |
| 2,422,009 A | 6/1947 | Goetze |
| 2,459,720 A | 1/1949 | Poltorak |
| 2,462,493 A | 2/1949 | Hamer |
| 2,462,762 A | 2/1949 | Nardin |
| 3,158,380 A | 11/1964 | Carrell et al. |
| 3,302,953 A | 2/1967 | Glasgow |
| 3,462,161 A | 8/1969 | Daubenberger et al. |
| 3,721,452 A | 3/1973 | Black |
| 3,747,963 A | 7/1973 | Shivak |
| 3,836,159 A | 9/1974 | Dryer |
| 4,034,993 A | 7/1977 | Okada et al. |
| 4,114,908 A | 9/1978 | Nicholson |
| 4,155,571 A | 5/1979 | Gastineau et al. |
| 4,364,982 A | 12/1982 | Gee |
| 4,776,600 A | 10/1988 | Kohn |
| 5,316,320 A | 5/1994 | Breaker |
| 5,518,257 A | 5/1996 | Breaker |
| 5,564,715 A | 10/1996 | Wallace |
| 6,173,969 B1 | 1/2001 | Stoll et al. |
| 6,186,513 B1 | 2/2001 | Udagawa |
| 6,290,237 B1 | 9/2001 | Graupner |
| 6,402,159 B1 * | 6/2002 | Kohn .............. F16L 23/16 277/608 |
| 6,409,180 B1 | 6/2002 | Spence et al. |
| 6,708,984 B1 | 3/2004 | North et al. |
| 6,854,739 B2 | 2/2005 | Schleth et al. |
| 6,994,356 B2 | 2/2006 | Veiga |

(Continued)

*Primary Examiner* — Nicholas L Foster
(74) *Attorney, Agent, or Firm* — Greg Mier

(57) ABSTRACT

A gasket that is capable of withstanding high compressive cads, protecting a flange joint from galvanic corrosion, and preventing fluids from leaking through a flange joint when the flange joint is exposed to extreme heat.

14 Claims, 3 Drawing Sheets

(56) References Cited

U.S. PATENT DOCUMENTS

| | | | |
|---|---|---|---|
| 7,350,833 | B2 | 4/2008 | Bongiorno |
| 7,976,074 | B2 | 7/2011 | Anderson et al. |
| 8,191,933 | B2 | 6/2012 | Rao et al. |
| 8,678,398 | B2 | 3/2014 | Anderson et al. |
| 9,726,292 | B2 | 8/2017 | Stirnemann et al. |
| 9,976,689 | B2 | 5/2018 | Kramer |
| 10,001,235 | B2 | 6/2018 | Bander et al. |
| 10,145,499 | B2 | 12/2018 | Karoliussen |
| 2002/0030326 | A1 | 3/2002 | Bettencourt |
| 2008/0111321 | A1* | 5/2008 | Okumura ............... F16J 15/104 |
| | | | 277/651 |
| 2011/0266755 | A1 | 11/2011 | Anderson et al. |
| 2015/0276105 | A1* | 10/2015 | Bander .................. F16L 23/18 |
| | | | 285/368 |

\* cited by examiner

INNER DIAMETER SEAL GASKET

CROSS REFERENCE TO RELATED APPLICATIONS

The present application claims priority from provisional patent application No. 62/678,318, filed on May 31, 2018.

FIELD OF THE INVENTION

The subject invention relates to gaskets.

BACKGROUND

It is common to use conduits to carry various fluids from one location to another. These conduits usually consist of a plurality of sections or segments joined together to form a continuous fluid communication pathway, commonly referred to as a pipeline. Pipelines are essential to most industries. Pipelines are used to transport liquids, gases, and other chemically stable fluids, such as water, sewer, and refined petroleum.

Flanges are an integral part of a pipeline, as they provide the connections necessary to link the sections of pipe that form a pipeline. Flanges also serve the purpose of incorporating valves and other fittings into the pipeline. A typical flange is a disc, collar, or ring that forms a rim at the end of a section of pipe. The disc, collar, or ring is typically welded to the end of the section of pipe to form the flange.

When two sections of pipe are equipped with flanges and joined together, a flange joint is formed. The flange joint is typically held together with threaded bolts and accompanying nuts, where the bolts extend through holes in the rim of the two flanges. Similar flange joints can exist between a section of pipe and a valve or other fittings.

Each flange has a flange face for mating with another flange face when a flange joint is formed. Flange gaskets are generally used to create a mechanical seal between two mating flange faces. When two mating flange faces are compressed together, a flange gasket inserted between the two mating flange faces typically fills the microscopic spaces and irregularities of the mating flange faces to prevent leakage from or into the flange joint.

One of the more desirable properties of a flange gasket, particularly in industrial applications, is to protect a flange joint from galvanic corrosion. In some applications, the fluid inside a pipe is highly caustic, leading to the deterioration of some types of flange gaskets and flanges, which can cause leaks and flange failures. To prevent such leaks and flange failures, the present invention provides a deformable seal on the inner diameter of the gasket, thereby protecting the integrity of the gasket from the fluid in the pipe and preventing the corrosive material from attacking the flange faces.

Providing a deformable seal on the inner diameter of the gasket also serves to protect gaskets that utilize a metal core. When these type gaskets are installed on pipelines carrying conductive fluid, the exposed metal core can act as a bridge between the two flanges, resulting in a "shorted" connection and loss of electrical isolation. The deformable seal on the inner diameter of the gasket prevents contact between the fluid in the pipe and the metal core of the gasket.

The challenge with developing a gasket having a deformable seal on the inner diameter of the gasket is to create a robust retention mechanism that keeps the deformable seal secure to the gasket during handling and shipment of the gasket, and also prevents the deformable seal from being drawn into the pipe in the event of drastic pressure changes.

As discussed in more detail below, the present invention is a flange gasket having all three of the desirable properties mentioned above.

BRIEF DESCRIPTION OF THE DRAWINGS

The accompanying drawings are provided for illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
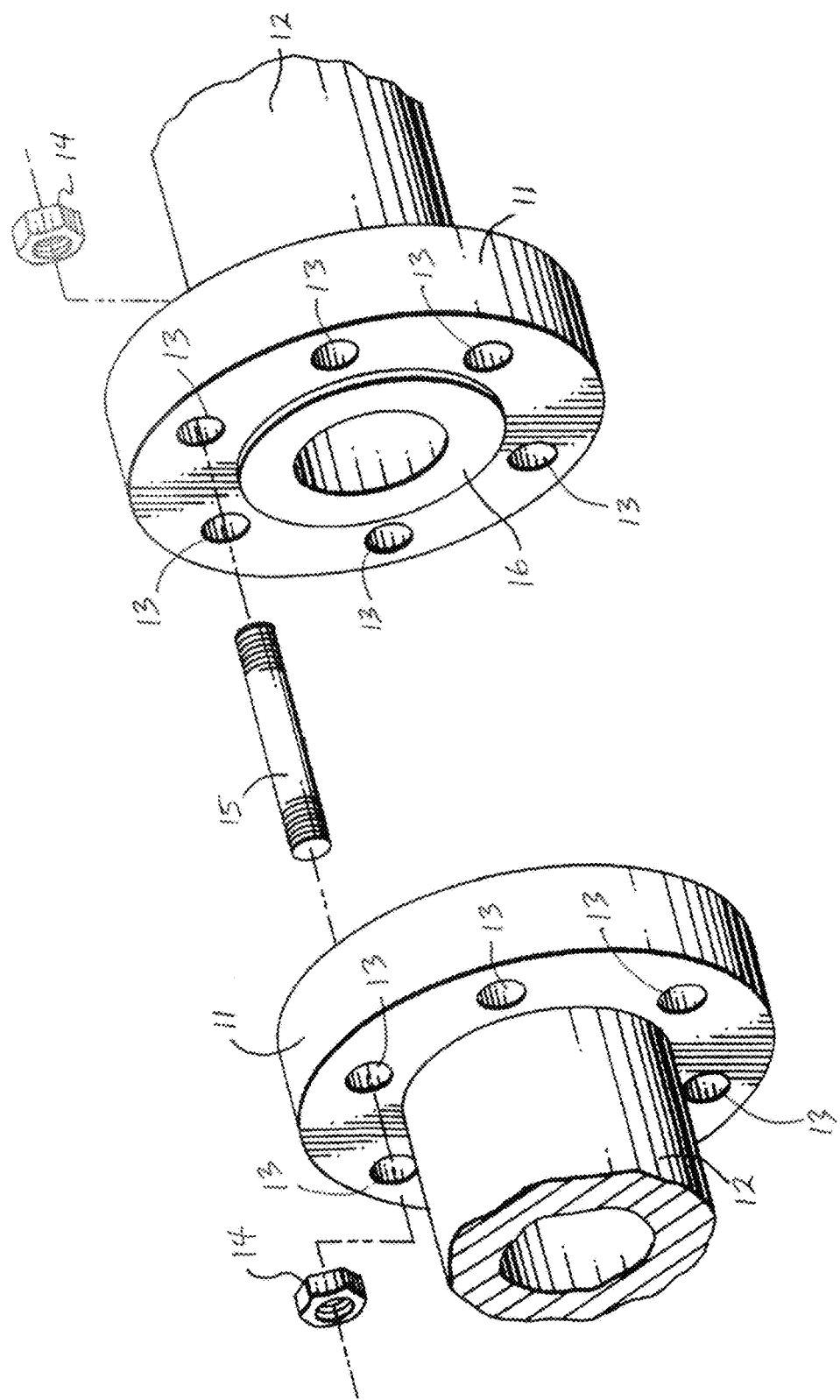
FIG. 1 is an exploded, isometric view of a flange joint between two sections of pipe.

FIG. 1 shows two flanges 11 in a flange joint between two sections of pipe 12. The two flanges 11 are typically equipped with aligned bores 13 so that the two flanges 11 can be connected by nut 14 and bolt 15 sets. A gasket, such as the gasket 10 of the present invention, is typically used to create a mechanical seal between two mating flange faces 16 (only one visible in FIG. 1) of the two flanges 11.

Figure 2:
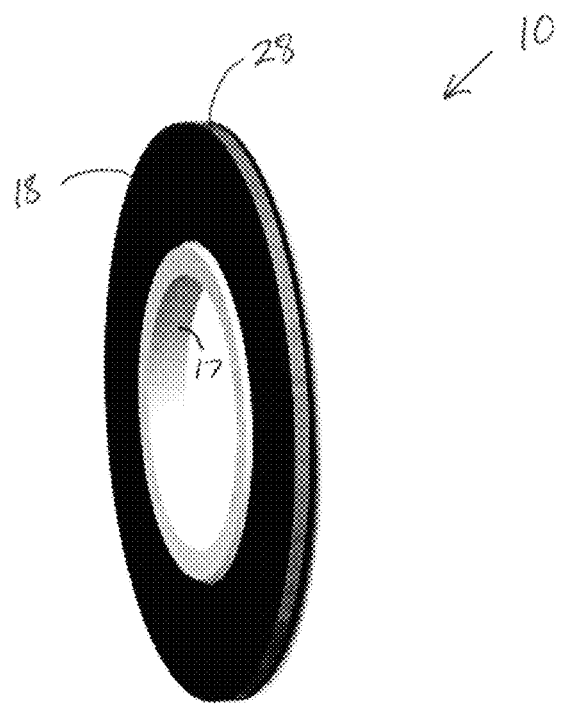
FIG. 2 is an isometric view of one embodiment of the inner diameter seal gasket of the present invention.
Figure 3:
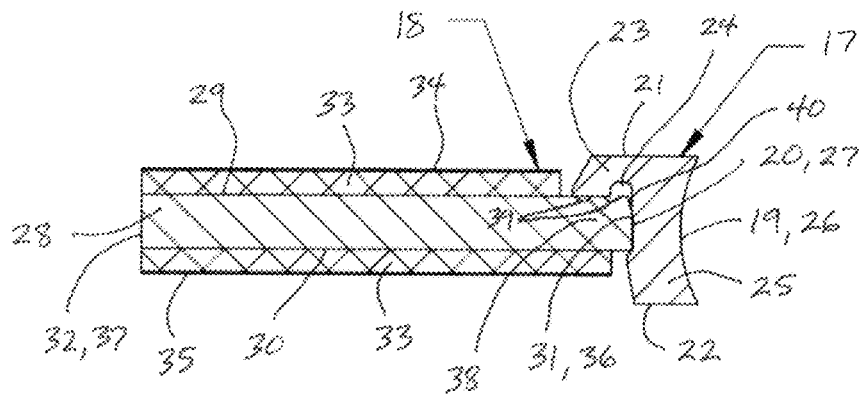
FIG. 3 is a side, cut away view of one embodiment of the inner diameter seal gasket of the present invention.
Figure 4:
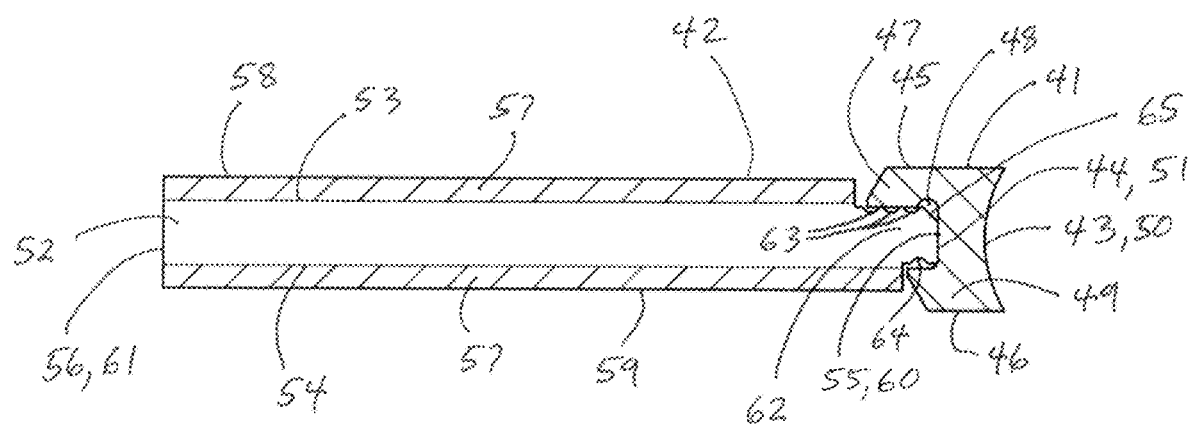
FIG. 4 is a side, cut away view of an alternative embodiment of the inner diameter seal gasket of the present invention.

As shown in FIGS. 2, 3, and 4, the present invention is a gasket 10 that is capable of withstanding high compressive loads, protecting a flange joint from galvanic corrosion, and preventing fluids from leaking through a flange joint when the flange joint is exposed to extreme heat. Gasket 10 can be manufactured in a variety of sizes, depending on the size of the flange or flanges to be sealed.

As shown in FIG. 2, the primary components of the gasket 10 of the present invention include an inner seal 17 and a retainer ring 18, each of which is discussed in more detail below. Inner seal 17 is preferably machined from a stock of rod or tube-shaped Polytetrafluoroethylene ("PTFE") or some other similar material that is preferably chemically inert and has excellent electrical insulation, high temperature resistance, a low coefficient of friction, corrosion resistance, and non-adhesive properties.

In one embodiment of the present invention, as shown in FIG. 3, inner seal 17 preferably has an inner surface 19, an outer surface 20, a first side 21, a second side 22, a wide rim 23 with an inner circumferential groove 24, and a tapered rim 25. Inner surface 19 of inner seal 17 preferably has concaved surface 26 that serves as a press-energizing feature after gasket 10 is installed. Outer surface 20 of inner seal 17 preferably has a recess 27 for receiving tab 38 of retainer ring 18, as discussed in more detail below.

In one embodiment of the present invention, as shown in FIG. 3, first side 21 of inner seal 17 has a wide rim 23. Second side 22 of inner seal 17 has a tapered rim 25. Tapered rim 25 facilitates the placement of inner seal 17 onto retainer ring 18.

In one embodiment of the present invention, as shown in FIG. 3, retainer ring 18 has a core 28 that is preferably cut from a sheet of raw metal. Core 28 preferably has a first side 29, a second side 30, an inner end 31, and an outer end 32. Both sides 29 and 30 of core 28 are preferably scored to give both sides 29 and 30 of core 28 a rough finish. After both sides 29 and 30 of core 28 are scored into a rough finish, a layer of dielectric material 33, such as fiberglass epoxy, is applied to the rough surface on both sides 29 and 30 of core 28, as shown in FIG. 3. The layers of dielectric material 33 are mechanically bonded to the rough surface on both sides 29 and 30 of core 28 preferably using heat and pressure.

After the layers of dielectric material 33 are bonded to both sides 29 and 30 of core 28 of retainer ring 18, retainer ring 18 is cut, preferably, but not necessarily, with a waterjet into a ring shape, as shown in FIG. 2. The resulting retainer ring 18 has a first side 34, a second side 35, an inner edge 36, and an outer edge 37, as shown in FIG. 3. Retainer ring 18 is then machined to create a tab 38 near inner end 31 of core 28, as shown in FIG. 3. The dimensions of tab 38 are critical to maintaining a tight fit between retainer ring 18 and inner seal 17, as discussed in more detail below.

Tab 38 is preferably created by removing a portion of the layer of dielectric material 33 from both sides 29 and 30 of core 28 near inner end 31 of core 28, as shown in FIG. 3. The amount of the layer of dielectric material 33 removed from both sides 29 and 30 of core 28 near inner end 31 of core 28 is proportional to the size of wide rim 23 and tapered rim 25, respectively, of inner seal 17. As shown in FIG. 3, wide rim 23 extends along first side 29 of core 28 further than tapered rim 25 extends along second side 30 of core 28, so the amount of the layer of dielectric material 33 removed from first side 29 of core 28 near inner end 31 of core 28 is greater than the amount of the layer of dielectric material 33 removed from second side 30 of core 28 near inner end 31 of core 28.

As shown in FIG. 3, the portion of first side 29 of core 28 where the layer of dielectric material 33 has been removed preferably has at least one circular groove 39 adjacent to the inner end 31 of core 28. The amount of the layer of dielectric material 33 removed from first side 29 of core 28 and the depth of the at least one circular groove 39 control the amount of compression experienced by wide rim 23 when gasket 10 is placed in service between two flanges 11.

As shown in FIG. 3, inner end 31 of core 28 has a tapered edge 40 adjacent to first side 29 of core 28 to facilitate the placement of inner seal 17 onto tab 38. When inner seal 17 is connected to retainer ring 18, tab 29 snaps into recess 27 of outer surface 20 of inner seal 17 and the tight fit between tab 29 and recess 27 restrains inner seal 17 in the radial direction and helps restrain inner seal 17 in the axial direction. Glue may be applied to inner seal 17 during assembly to eliminate free movement of inner seal 17 on retainer ring 18.

A second embodiment of the gasket 10 of the present invention is shown in FIG. 4. The primary components of the gasket 10 of the second embodiment of the present invention include an inner seal 41 and a retainer ring 42, each of which is discussed in more detail below. Inner seal 41 is preferably machined from a stock of rod or tube-shaped Polytetrafluoroethylene ("PTFE") or some other similar material that is preferably chemically inert and has excellent electrical insulation, high temperature resistance, a low coefficient of friction, corrosion resistance, and non-adhesive properties.

In the second embodiment of the present invention, as shown in FIG. 4, inner seal 41 preferably has an inner surface 43, an outer surface 44, a first side 45, a second side 46, a wide rim 47 with an inner circumferential groove 48, and a tapered rim 49. Inner surface 43 of inner seal 41 preferably has concaved surface 50 that serves as a press-energizing feature after gasket 10 is installed. Outer surface 44 of inner seal 41 preferably has a recess 51 for receiving tab 62 of retainer ring 42, as discussed in more detail below.

In the second embodiment of the present invention, as shown in FIG. 4, first side 45 of inner seal 41 has a wide rim 47. Second side 46 of inner seal 41 has a tapered rim 49. Tapered rim 49 facilitates the placement of inner seal 41 onto retainer ring 42.

In the second embodiment of the present invention, as shown in FIG. 4, retainer ring 42 has a core 52 that is preferably cut from a sheet of raw metal. Core 52 preferably has a first side 53, a second side 54, an inner end 55, and an outer end 56. Both sides 53 and 54 of core 52 are preferably scored to give both sides 53 and 54 of core 52 a rough finish. After both sides 53 and 54 of core 52 are scored into a rough finish, a layer of dielectric material 57, such as fiberglass epoxy, is applied to the rough surface on both sides 53 and 54 of core 52, as shown in FIG. 4. The layers of dielectric material 57 are mechanically bonded to the rough surface on both sides 53 and 54 of core 52 preferably using heat and pressure.

After the layers of dielectric material 57 are bonded to both sides 53 and 54 of core 52 of retainer ring 42, retainer ring 42 is cut, preferably, but not necessarily, with a waterjet into a ring shape, as shown in FIG. 2. The resulting retainer ring 42 has a first side 58, a second side 59, an inner edge 60, and an outer edge 61, as shown in FIG. 4. Retainer ring 42 is then machined to create a tab 62 near inner end 55 of core 52, as shown in FIG. 4. The dimensions of tab 62 are critical to maintaining a tight fit between retainer ring 42 and inner seal 41, as discussed in more detail below.

Tab 62 is preferably created by removing a portion of the layer of dielectric material 57 from both sides 53 and 54 of core 52 near inner end 55 of core 52, as shown in FIG. 4. The amount of the layer of dielectric material 57 removed from both sides 53 and 54 of core 52 near inner end 55 of core 52 is proportional to the size of wide rim 47 and tapered rim 49, respectively, of inner seal 41. As shown in FIG. 4, wide rim 47 extends along first side 53 of core 52 further than tapered rim 49 extends along second side 54 of core 52, so the amount of the layer of dielectric material 57 removed from first side 53 of core 52 near inner end 55 of core 52 is greater than the amount of the layer of dielectric material 57 removed from second side 54 of core 52 near inner end 55 of core 52.

As shown in FIG. 4, the portion of first side 53 of core 52 where the layer of dielectric material 57 has been removed preferably has a plurality of circular grooves 63 adjacent to the inner end 55 of core 52. The amount of the layer of dielectric material 57 removed from first side 53 of core 52 and the depth of the plurality of circular grooves 63 control the amount of compression experienced by wide rim 47 when gasket 10 is placed in service between two flanges 11.

As shown in FIG. 4, second side 59 of retainer ring 42 has a circular relief groove 64 adjacent to the inner end 55 of core 52 to allow for tapered rim 49 to snap over the corner of tab 62 and allow for material to flow during compression.

As shown in FIG. 4, inner end 55 of core 52 has a tapered edge 65 adjacent to first side 53 of core 52 to facilitate the placement of inner seal 41 onto tab 62. When inner seal 41 is connected to retainer ring 42, tab 62 snaps into recess 51 of outer surface 44 of inner seal 41 and the tight fit between tab 62 and recess 51 restrains inner seal 41 in the radial direction and helps restrain inner seal 41 in the axial direction.

In the second embodiment of the present invention, as shown in FIG. 4, tapered rim 49 is more pronounced and wraps around tab 62 more than the tapered rim 25 of the first embodiment of the present invention shown in FIG. 3. The space where the layer of dielectric material 57 has been removed from the second side 54 of core 52 allows for easier assembly of inner seal 41 onto tab 62. Glue may be applied to inner seal 41 during assembly to eliminate free movement of inner seal 41 on retainer ring 42.

It is understood that two embodiments of the present invention have been disclosed by way of example and that other modifications and alterations may occur to those skilled in the art without departing from the scope and spirit of the present invention.

What is claimed is:

1. A gasket for maintaining a mechanical seal between two flanges, said gasket comprising:
   (a) a ring-shaped retainer ring having a first side, a second side, an inner edge, an outer edge, and a ring-shaped core, said core having a first side, a second side, an inner end, and an outer end;
   (b) a layer of dielectric material mechanically bonded to said first side of said core and a layer of dielectric material mechanically bonded to said second side of said core, where a portion of said first side of said core adjacent to said inner end of said core is not covered by said dielectric material and where a portion of said second side of said core adjacent to said inner end of said core is not covered by said dielectric material to create a tab at said inner edge of said core;
   (c) an inner seal attached to said tab at said inner edge of said core of said retainer, said inner seal having inner surface, an outer surface, a first side, a second side, a wide rim on said first side of said inner seal positioned over a portion of said first side of said core not covered by said dielectric material, and a tapered rim on said second side of said inner seal positioned over a portion of said second side of said core not covered by said dielectric material, said inner surface of said inner seal having a concave surface, said outer surface of said inner seal having a recess for receiving said tab at said inner edge of said core, said wide rim on said first side of said inner seal having an inner circumferential groove, said wide rim on said first side of said inner seal having a length, and said tapered rim on said second side of said inner seal having a length;
   (d) at least one circular groove in said first side of said core adjacent to said inner end of said core; and
   (e) a tapered edge that tapers axially and radially outward on said inner end of said core adjacent to said first side of said core.

2. The gasket of claim 1, where said core is cut from a sheet of raw metal.

3. The gasket of claim 2, where said first side of said core and said second side of said core are scored to create a rough surface on said first side of said core and said second side of said core.

4. The gasket of claim 3, where said layer of dielectric material mechanically bonded to said first side of said core and said layer of dielectric material mechanically bonded to said second side of said core are made of fiberglass epoxy.

5. The gasket of claim 4, where said length of said wide rim on said first side of said inner seal is longer than said length of said tapered rim on said second side of said inner seal.

6. The gasket of claim 5, where said portion of said first side of said core not covered by said dielectric material has a length that is proportional to said length of said wide rim on said first side of said inner seal, and where said portion of said second side of said core not covered by said dielectric material has a length that is proportional to said length of said tapered rim on said second side of said inner seal.

7. The gasket of claim 6, where said inner seal is made from polytetrafluoroethylene.

8. A gasket for maintaining a mechanical seal between two flanges, said gasket comprising:
   (a) a ring-shaped retainer ring having a first side, a second side, an inner edge, an outer edge, and a ring-shaped core, said core having a first side, a second side, an inner end, and an outer end;
   (b) a layer of dielectric material mechanically bonded to said first side of said core and a layer of dielectric material mechanically bonded to said second side of said core, where a portion of said first side of said core adjacent to said inner end of said core is not covered by said dielectric material and where a portion of said second side of said core adjacent to said inner end of said core is not covered by said dielectric material to create a tab at said inner edge of said core;
   (c) an inner seal attached to said tab at said inner edge of said core of said retainer, said inner seal having inner surface, an outer surface, a first side, a second side, a wide rim on said first side of said inner seal positioned over a portion of said first side of said core not covered by said dielectric material, and a tapered rim on said second side of said inner seal positioned over a portion of said second side of said core not covered by said dielectric material, said inner surface of said inner seal having a concave surface, said outer surface of said inner seal having a recess for receiving said tab at said inner edge of said core, said wide rim on said first side of said inner seal having an inner circumferential groove, said wide rim on said first side of said inner seal having a length, and said tapered rim on said second side of said inner seal having a length;
   (d) a plurality of circular grooves in said first side of said core adjacent to said inner end of said core;
   (e) a circular relief groove in said second side of said core adjacent to said inner end of said core; and
   (f) a tapered edge that tapers axially and radially outward on said inner end of said core adjacent to said first side of said core.

9. The gasket of claim 8, where said core is cut from a sheet of raw metal.

10. The gasket of claim 9, where said first side of said core and said second side of said core are scored to create a rough surface on said first side of said core and said second side of said core.

11. The gasket of claim 10, where said layer of dielectric material mechanically bonded to said first side of said core and said layer of dielectric material mechanically bonded to said second side of said core are made of fiberglass epoxy.

12. The gasket of claim 11, where said length of said wide rim on said first side of said inner seal is longer than said length of said tapered rim on said second side of said inner seal.

13. The gasket of claim 12, where said portion of said first side of said core not covered by said dielectric material has a length that is proportional to said length of said wide rim on said first side of said inner seal, and where said portion of said second side of said core not covered by said dielectric material has a length that is proportional to said length of said tapered rim on said second side of said inner seal.

14. The gasket of claim 13, where said inner seal is made from polytetrafluoroethylene.

\* \* \* \* \*